No. 739,266. PATENTED SEPT. 15, 1903.
J. F. MILLIGAN.
ATTACHMENT FOR SPRING BALANCE SCALES.
APPLICATION FILED APR. 4, 1902.
NO MODEL.
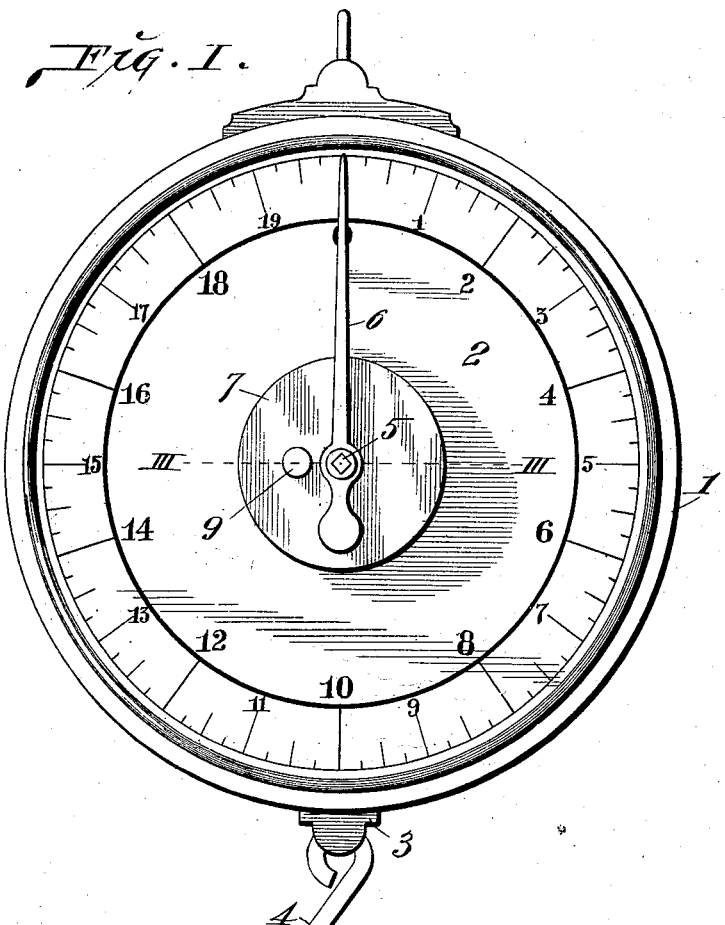
Fig. I.
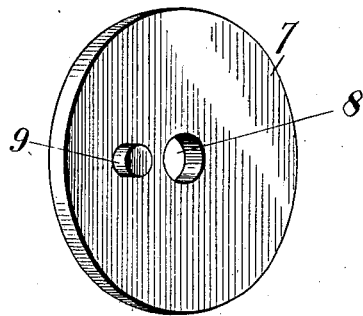
Fig. II.
Fig. III.
Attest:—
W. P. Smith
E. J. Knight
Inventor:—
J. F. Milligan:—
By Wright Bro.
atty's.

No. 739,266. Patented September 15, 1903.

UNITED STATES PATENT OFFICE.

JOHN F. MILLIGAN, OF ST. LOUIS, MISSOURI, ASSIGNOR OF ONE-HALF TO EUGENE E. STARR, OF ST. LOUIS, MISSOURI.

ATTACHMENT FOR SPRING-BALANCE SCALES.

SPECIFICATION forming part of Letters Patent No. 739,266, dated September 15, 1903.

Application filed Apr. 14, 1902. Serial No. 101,347. (No model.)

*To all whom it may concern:*

Be it known that I, JOHN F. MILLIGAN, a citizen of the United States, residing in the city of St. Louis, in the State of Missouri, have invented certain new and useful Improvements in Attachments for Spring-Balance Scales, of which the following is a full, clear, and exact description, reference being had to the accompanying drawings, forming part of this specification.

My invention relates to an attachment applied to the arbor of a spring-balance scale for the purpose of preventing the vibration of the pointer that traverses the dial of the scale, the construction being such that the pointer is brought immediately to rest when any article is placed upon the pan of the scale instead of its being permitted to oscillate across the dial, as is usually the case in spring-balance scales.

My invention consists in features of novelty hereinafter fully described, and pointed out in the claims.

Figure I is a front view of a spring-balance scale having my attachment applied thereto. Fig. II is a perspective view of the attachment. Fig. III is a section taken on line III III, Fig. I.

1 designates the housing of the scale, that carries the dial 2. The housing 1 contains the mechanism usual to spring-balance scales that is connected to the reciprocating spring-actuated member 3, provided with the hook 4, on which the scale-pan is hung.

5 is the arbor, to which the oscillating pointer 6, having a long arm and a short arm, is attached. The parts thus far described may be of any ordinary construction usual to spring-balance scales, as no invention *per se* is herein claimed for them.

7 designates a plate loosely mounted upon the arbor 5 between the dial 2 and pointer 6, adapted for free rotation on said arbor, the plate being preferably in the form of a disk, as shown, provided with a central arbor-receiving aperture 8. On the face of the plate 7 is a stud or projection 9, that projects sufficiently from said plate to provide for its contact with the pointer 6.

In the practical use of a scale provided with my attachment when an article is placed upon the scale-pan to be weighed the usual scale mechanism operates in the well-known manner, causing the pointer 6 to traverse the face of the scale-dial until it reaches a point thereon that indicates the weight of the article placed in the pan. Without the use of the attachment herein described the pointer vibrates to a considerable extent over the face of the dial before reaching a settled position after the article has been put in the scale-pan, this oscillation being a serious cause of delay and annoyance to the user of the scale that necessitates a wait until the pointer has become settled. In the use of my attachment the pointer 6 when movement is imparted thereto strikes against the stud 9, carried by the plate 7, by either its long or short arm first striking the stud and shifts said plate rockingly on the scale-arbor, so that the stud will oscillate to the pointer at a position on the opposite side of the arbor from that originally struck, and therefore the movement of the pointer is opposed and brought immediately to rest instead of its vibration being continued, as usual.

It will be seen that the stud 9 is retained between the long and short arms of the pointer 6, so that on the return movement of the pointer to zero on the scale-dial one or the other of the pointer-arms first strikes said stud and throws it to the other arm to break the vibratory movement of the pointer and bring it to rest quickly and positively.

While I have shown and described the plate 7 as bearing the stud 9, I do not desire to be limited to the plate being so provided, inasmuch as the desired end to be obtained by the use of my attachment may in a measure be obtained by the plate without the stud, which will act in the case of weighing small articles to present a friction on the scale-arbor that will cause said arbor and the pointer carried thereby to be brought to rest and the vibration of the pointer prevented. The plate 7 is approximately balanced on the arbor 5, so that it will remain in any position to which it may be moved and so that it is adapted to receive the frictional contact of the arbor at all times to be oscillated thereby for the purpose stated.

I claim as my invention—

1. In a spring-balance scale, the combination with the arbor, of a pointer having a long arm and a short arm, a plate loosely mounted on said arbor, and a stud carried by said plate, and arranged to be engaged by both the long and the short arms of said pointer, for the purpose stated.

2. The combination with the arbor and a pointer, of a plate loosely mounted on the arbor and extending equidistant in all directions from the arbor, and a stud carried by the plate and adapted to be engaged by the pointer to prevent vibrations of the pointer.

JOHN F. MILLIGAN.

In presence of—
E. S. KNIGHT,
M. P. SMITH.